Feb. 4, 1958  W. J. DE BEAUBIEN  2,821,894
AUTOMOTIVE HEATING, VENTILATING AND DEFROSTING SYSTEM
Filed Sept. 21, 1954  4 Sheets-Sheet 1
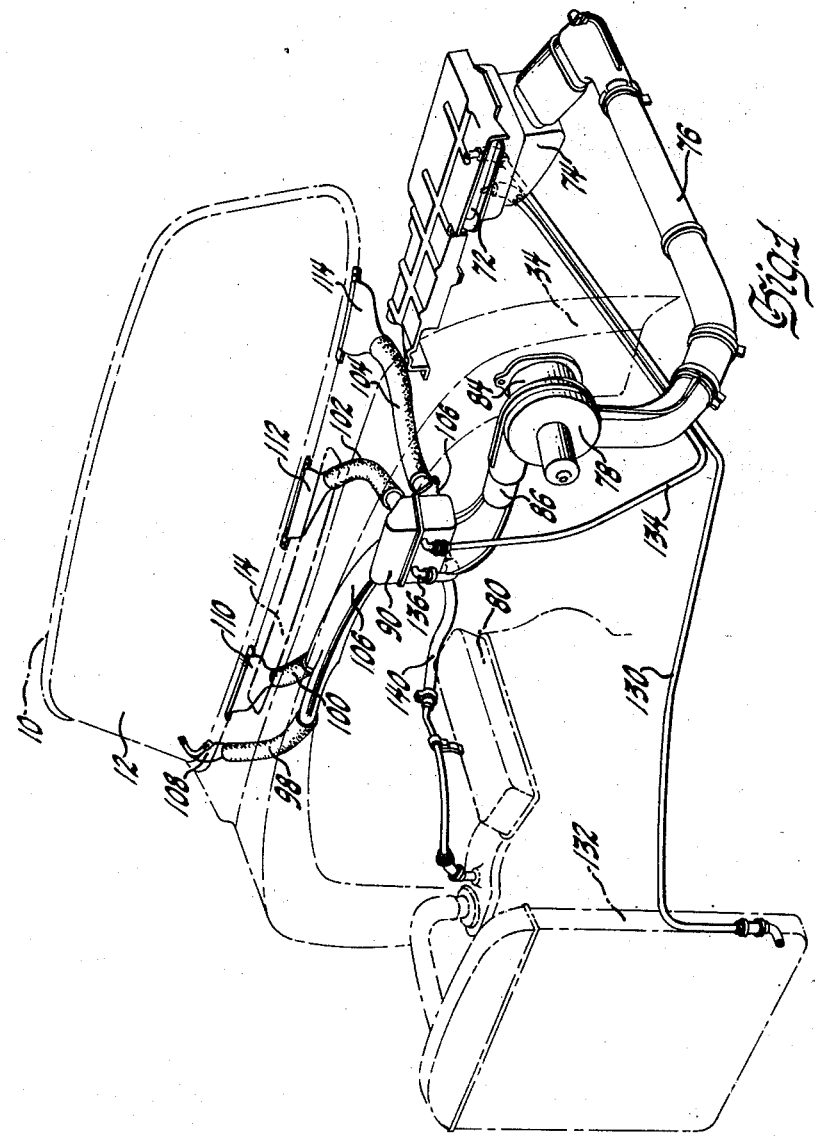
INVENTOR
William J. de Beaubien
BY
C. F. Dibble
ATTORNEY

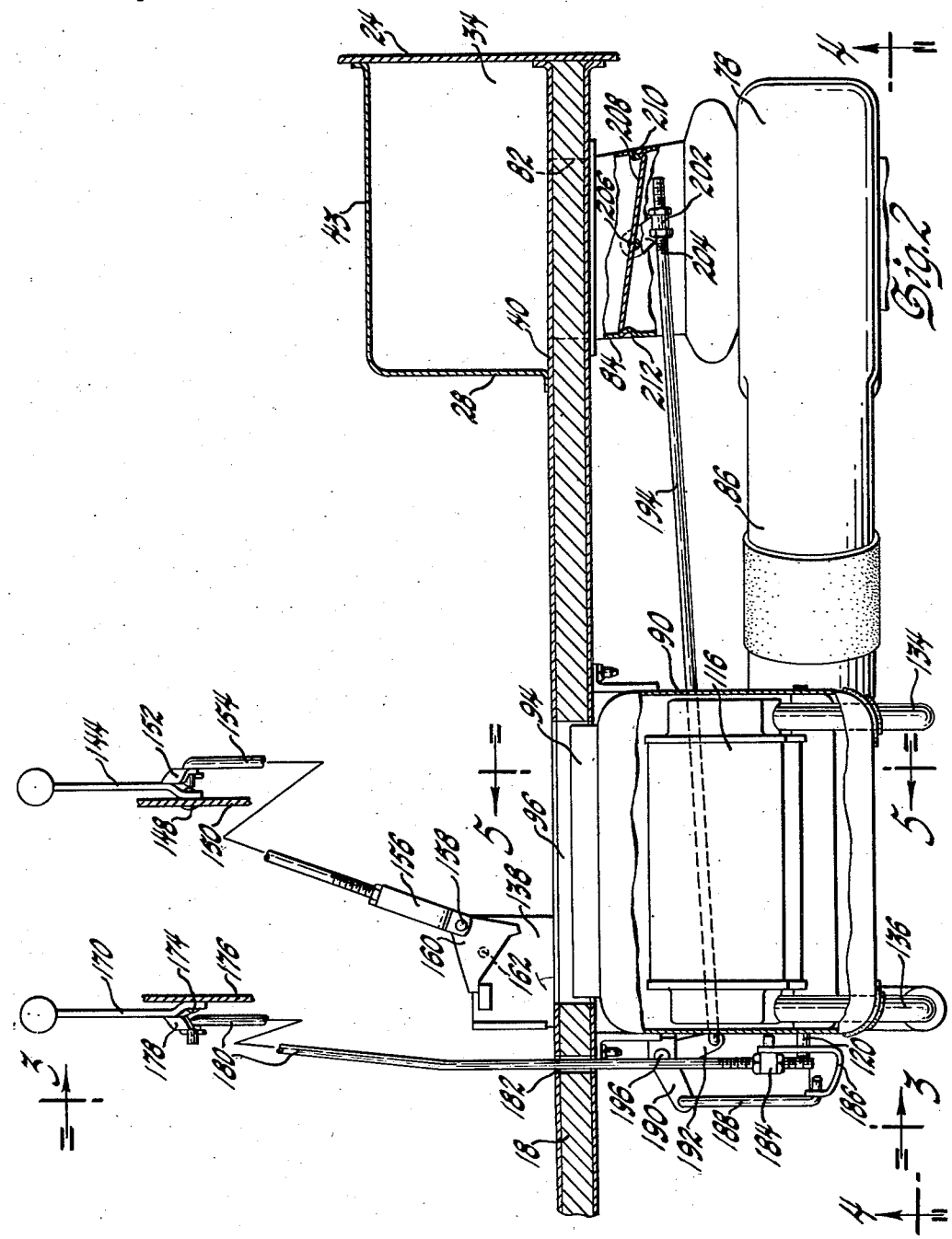

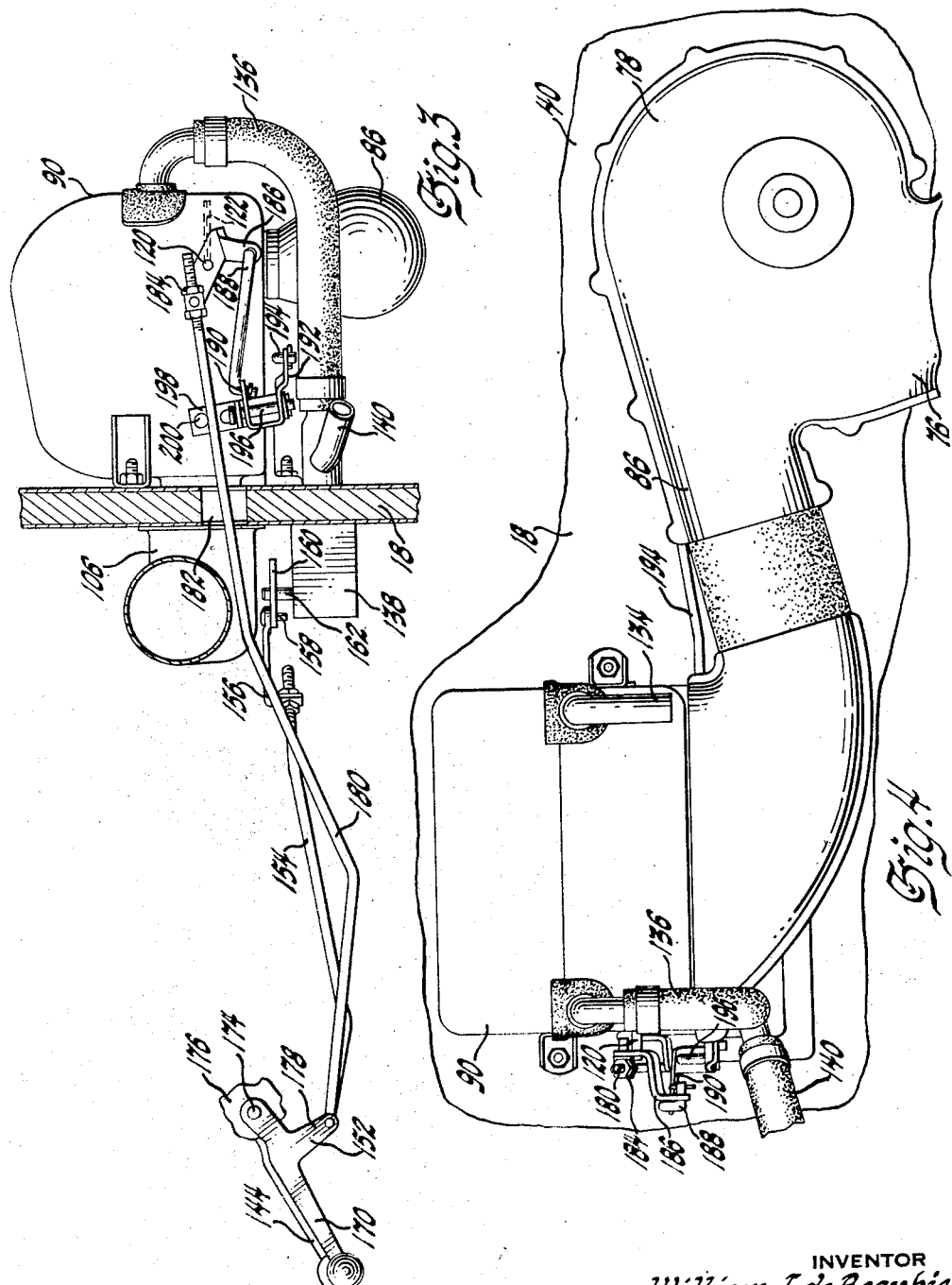

Feb. 4, 1958 W. J. DE BEAUBIEN 2,821,894
AUTOMOTIVE HEATING, VENTILATING AND DEFROSTING SYSTEM
Filed Sept. 21, 1954 4 Sheets-Sheet 4

INVENTOR
William J. de Beaubien
BY
C. F. Dibble
ATTORNEY

United States Patent Office 2,821,894
Patented Feb. 4, 1958

2,821,894

AUTOMOTIVE HEATING, VENTILATING, AND DEFROSTING SYSTEM

William J. de Beaubien, Birmingham, Mich., assignor to General Motors Corporation, Detroit, Mich., a corporation of Delaware Application September 21, 1954, Serial No. 457,450

3 Claims. (Cl. 98—2)

This invention relates to heating and ventilating systems and more particularly to systems for heating, ventilating and defrosting to be employed in automotive vehicles.

In a system of this type it is desirable that the controls be as simple and convenient to operate as possible. It is also desirable that a minimum of parts be employed to facilitate maintenance and to reduce the cost and, at the same time, to increase overall efficiency. The system should be such that it is capable of considerably improving comfort conditions for the passengers despite wide variations in weather conditions which may be encountered. To promote comfort, air conditions should be characterized by uniformity throughout the passenger compartment, freedom from objectionable drafts, and also freedom from objectionable moisture which may sometimes be entrained in the air. The control of the air flow through the various instrumentalities should possess such sensitivity as to be prompt and effective. In the present instance it is also desirable that the system provided be suitable for use with a vehicle body having an air inlet located relatively high on the vehicle in the interest of securing a minimum of exhaust fumes from other vehicles and a shroud chamber for separating moisture from the air admitted. It will be appreciated that modern vehicles require a large volume of ventilating air and that the problem of entrained moisture in such large volume of air is difficult to contend with. A body suitable for ventilation purposes and to which the present invention may be applied is disclosed in the copending application for United States Letters Patent S. N. 455,056 filed September 9, 1954, in the names of Leslie, Fox and Premo.

To these ends an object of the present invention is to provide an improved system in a motor vehicle for heating, ventilating and defrosting by means of air taken from a shroud chamber by means of a single blower.

Another object of the invention is to provide a combination of a cowl structure having a shroud chamber into which outside air is admitted with a heating, ventilating and defrosting system of maximum simplicity and ease of control.

A feature of the present invention is a vehicle body with a shroud chamber for receiving outside air and a single blower arranged with the aid of two heater cores to heat, ventilate and defrost an automotive vehicle.

A second feature of the invention comprises a blower for forcing air from a shroud chamber to defrost a windshield and to heat the passenger compartment with valve means arranged to control the air flow from the shroud chamber and to adjust the heating, ventilating and defrosting effects.

These and other important features of the invention will now be described in detail in the specification and then pointed out more particularly in the appended claims.

In the drawings:

Fig. 1 is a perspective view of a heating, ventilating and defrosting system as installed with respect to a windshield cowl structure and other structure of an automobile and which system embodies the present invention;

Fig. 2 is a sectional view drawn to a larger scale and taken through the fire wall of a structure shown in Fig. 1 just above the system elements as mounted in the engine compartment;

Fig. 3 is a sectional view taken along the line 3—3 in Fig. 2;

Fig. 4 is an elevational view taken in the direction of the arrows 4—4 in Fig. 2;

Figure 5:
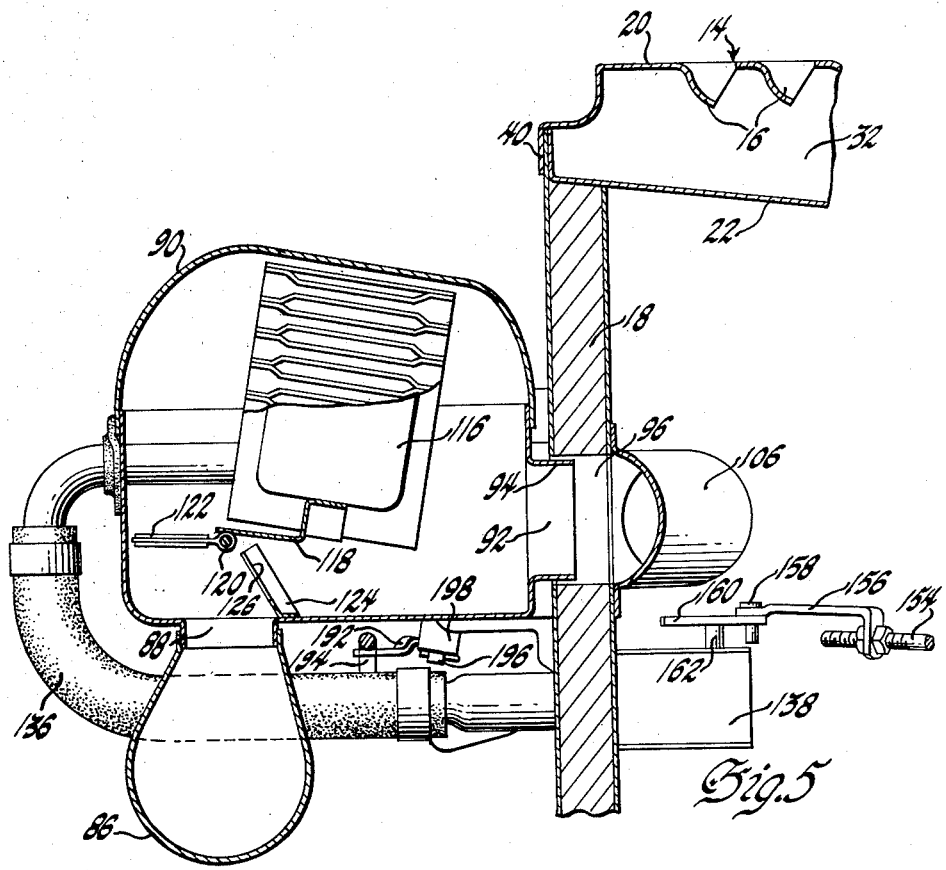
Fig. 5 is a sectional view taken along the line 5—5 in Fig. 2.

As used herein, the term "shroud" is practically synonymous with the word "cowl" and embraces that portion of the body which extends across and down each side below the windshield and forward of the front door hinge pillars.

The phantom portion of Fig. 1 shows an automobile body 10 with a windshield 12 and a cowl air inlet 14 located just forward of the windshield. This air inlet is louvered as at 16, shown in Fig. 5, to admit air into a cowl structure which extends rearwardly from a fire wall 18. This cowl structure comprises a top wall 20, an upper inside wall 22, outer outside body panels 24 and 26, and inside body panels 28 and 30. This cowl structure encloses a substantially horizontal chamber 32, the ends of which communicate with a left-hand shroud chamber 34 and a right-hand shroud chamber 36. The chambers 32, 34 and 36 are closed off forwardly by a marginal portion 40 of the fire wall 18. These chambers are also closed off just forward of an instrument panel 42 by a partition 43, a portion of which is shown in Fig. 2. Each of the chambers 34 and 36 may be drained of moisture by means of outlets such as the outlet 44 shown in Fig. 6. The patent application S. N. 455,056 heretofore referred to shows the cowl structure.

If ventilation of the passenger compartment is required, air is admitted through the louvered opening 14 and subsequently into the two shroud chambers 34 and 36 from which air may be directed into the passenger compartment by means of flanged ducts 46 and 48. The flow through the latter is controlled by valve members 50 and 52, respectively, which may be operated by knobs 54 and 56 mounted beneath the central portion of the instrument panel 42. These knobs control Bowden wires 58 and 60 guided in conduits 62 and 64, respectively. The Bowden wire 58 is operatively connected to a crank member 66 made part of the valve 50. The Bowden wire 60 has one end operatively connected to the crank 68 which is integral with the shaft forming part of the valve 52. The arrangement is such that pulling the knob 54 or 56 will serve to open the valve 50 or the valve 52. The arrangement is such that a large amount of ventilating air may be admitted to the passenger compartment without admitting objectionable entrained moisture.

A conventional underseat heater having a core 72 (Fig. 1) is mounted in the floor of the vehicle and its casing 74 is connected by a conduit arrangement 76 leading to a blower 78 mounted forward of the shroud chamber 34 and in the compartment for the engine 80. An opening 82 is formed in the fire wall 18 and leads from the shroud chamber 34 into a short duct or conduit 84 which is attached to the fire wall and serves to support the blower 78 as well as to provide an air inlet for the latter. The blower 78 is provided with two outlets, one being vertical and forming a part of the conduit system 76 and the other being directed in a more horizontal direction and forming part of a conduit system 86 leading through an opening 88 (Fig. 5) into the bottom of a heater casing 90. The latter is provided with an opening 92 defined by a flange 94 which extends into an opening 96 of the fire wall 18. Communicating with the opening 96 on the passenger side of the fire wall by means of the manifold 106 are ducts 98, 100, 102 and 104. The ducts 98, 100, 102 and 104 are connected to defroster nozzles 108, 110, 112 and 114, respectively, for directing air upwardly and against the inner surface of the windshield 12.

The casing 90 is sufficiently large to accommodate a heater core 116 with a considerable space around the forward, bottom and rear sides of the core. A baffle member 118 is attached to the underside of the core and extends forwardly to terminate just above a shaft 120 supporting a valve 122. Beneath the baffle 118 is a stop member 124 which is U-shaped and affixed to the bottom and end walls of the casing 90. This stop member 124 is so formed as to provide a space 126 for the passage of air when the valve member 122 is not in contact therewith.

A conduit 130 communicates with the bottom tank of the radiator 132 and is connected to one end of the heater core 72. The other end of the core 72 is connected by means of a conduit 134 to one end of the defroster heater core 116. The other end of the core 116 is connected by means of a conduit 136 to a temperature control valve 138. Another conduit 140 connects the upper portion of the engine cooling system to the temperature control valve 138. Such a control valve is thermostatically operable to secure a required water flow through the heater cores to effect the selected degree of heating of the air. A suitable valve of this type is disclosed in the United States Letters Patent No. 2,663,499, granted December 22, 1953, in the name of A. J. Schutt.

Figure 6:
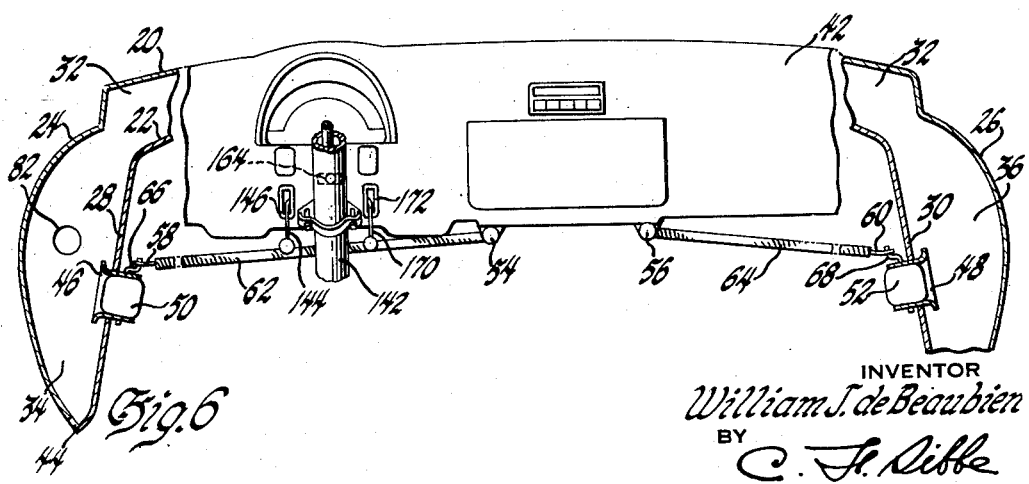
Fig. 6 is a sectional view taken through the cowl structure of an automobile body shown in Fig. 1, a portion thereof showing the instrument panel as viewed by the passengers and portions of the figure depicting contours of the shroud chambers formed in the body.

To the left of the steering column 142, as shown in Fig. 6, is arranged a vertically movable lever 144 which protrudes through a slot 146 in the instrument panel 42. This lever is pivoted at 148 (Fig. 2) to a bracket 150 which is rigidly attached to the body 10. A dependent arm 152 of the lever 144 serves as a journal for one end of a rod 154. The other end of this rod is threadedly connected to a bracket 156 which is pivoted at 158 to one corner of a triangular plate 160 pivoted at 162 to the frame of the valve 138.

To the right of the steering column 142 is a vertically movable lever 170 which extends through a slot 172 in the instrument panel 42 and is pivoted at 174 to a bracket 176 which is part of the body 10. A depending arm 178 which is integral with the lever 170 is drilled pivotally to receive one end of a rod 180 which extends through an opening or vertical slot 182 in the fire wall and is pivotally connected at its other end at 184 to one arm of a bracket 186. This bracket is fixed to the end of the shaft 120 to rotate therewith. Pivoted to the lower end of the bracket 186 is one end of a short rod 188 and the other end of the latter is pivoted to one end of a lever 190. Integral with the latter is a lower lever arm 192 and into the end of this is pivoted one end of a long rod 194. The arms 190 and 192 are conveniently made in one piece so that a conventional hub may be dispensed with and the arms may be perforated to accommodate a pivot pin 196 which is supported on a bracket 198 attached at 200 to the side of the casing 90. The other end of the rod 194 is provided with a pivoted and adjustable connection 202 to an arm 204 which is fixed to a vertical shaft 206 journaled in the side of the conduit 84. A valve 208 is mounted on and fixed to the shaft 206 and shoulder portions 210 and 212 are formed on the inside wall of the conduit 84 to constitute a seating for the valve 208.

A switch 164 (Fig. 6) is placed on the instrument panel 42 just above the steering column 142. This is used to control the motor for the blower.

From the above description, it may be seen that no heat is provided in the front portion of the passenger compartment except that which may be discharged from the defroster nozzles or the underseat heater core 72.

Assuming that no heat for the passengers is required, then proper operation of the lever 170 will close the valve 208 and no air is supplied to the blower 78 for delivery to either of the heater cores 72 or 116. In such an event, outside air may be admitted through the louvered inlet 14, both shroud chambers 34 and 36, and be conducted by way of conduits 46 and 48 with proper manipulation of the knobs 54 and 56 to the passenger compartment.

In the event that heat is required in the passenger compartment the outside air inlet valves 50 and 52 are closed by operation of the knobs 54 and 56 and lever 144 is operated to adjust the thermostatic valve 138 to suit weather conditions of the heating effect desired. If a great deal of heat is required in the two heater cores, then valve 138 may be adjusted accordingly and will operate automatically to maintain the selected temperature for the water in the cores as heretofore stated and as is well known.

To heat the air before its admission into the passenger compartment, the valve 208 must be opened and this performed by proper manipulation of the lever 170 in which event air passes from the shroud chamber 34 through the conduit 84 and into the blower 78 from which the air is diverted and forced through the casings of the two heater cores 72 and 116 as desired.

The arrangement is such that when the lever 170 is placed in its highest position, the valve 122 will be in its horizontal position as viewed in Fig. 5. Because of the linkages connecting the valve 122 with the valve 208, the latter will be closed or seated against its seats 210 and 212. No heat is utilized in this position of the controls.

If the lever 170 is lowered somewhat, valve 122 will swing downwardly about 70° from its horizontal position and valve 208 will open. With this adjustment air will enter the blower and, assuming that the blower 78 is operating at low car speed, or ram air is being admitted at a high range of car speeds, air will be driven therefrom through the underseat heater core 72 into the passenger compartment and also through the casing 90 and beneath the core 116 by way of the opening 126. It will be seen, therefore, that in this adjustment of the controls no air will pass through the core 116 but cool outside air will by-pass the same and pass into the manifold 106 for distribution through the defroster nozzles for effective defogging of the windshield 12.

With the lever 170 fully lowered, valve 122 will close the opening 126 and air from the blower 78 will pass through both heater cores 72 and 116 for maximum heating effect. De-icing of the windshield 12 is possible in a very short time under these conditions.

It will be seen that placement of the lever 170 in an intermediate position will place valve 122 so that a desired mixture of partially warmed air will pass through the opening 92 to the defroster nozzles.

It will be noted that there is only one blower employed in the entire system, that shutting off the air to either one of the heater casings shuts it off to the other, and that the entire arrangement is quite simple, compact and rugged in construction.

I claim:

1. A heating, ventilating and defrosting system on a vehicle body having a windshield, engine and passenger compartments separated by a fire wall, and a cowl structure at the base of the windshield defining a shroud chamber extending downwardly at one side of the body and to the rear of said fire wall, said cowl structure having a vertically extending air inlet forward and adjacent the base of said windshield and communicating through the cowl structure with said shroud chamber, a blower mounted in the engine compartment with a horizontal air inlet leading through said fire wall and from said shroud chamber, a main valve controlling said horizontal air inlet, a first heater core mounted in a casing forward of said fire wall, a second heater core associated with said passenger compartment and spaced from said first heater core, duct means leading from said blower to each of said heater cores, a by-pass valve in said casing for causing air from said duct means to by-pass said first heater core, defroster nozzle means associated with said windshield, and means for directing air by-passing said first heater core from said by-pass valve to said defroster nozzle means.

2. A system such as described in claim 1 including unitary control means operable from the passenger compartment and connected to said main valve and by-pass valve whereby air discharged from said blower may be wholly directed to said second heater core and then directed to both of said heater cores by selective adjustment of said valves.

3. A system such as described in claim 1 including unitary control means operable from the passenger compartment and connected to said main valve and by-pass valve whereby air discharged from said blower may be directed to the second heater core for heating the passenger compartment and simultaneously around the first heater core because of said by-pass valve for discharge by said defroster nozzle means against the windshield by selective adjustment of said valves.

References Cited in the file of this patent

UNITED STATES PATENTS

| | | |
|---|---|---|
| 2,237,477 | Colvin | Apr. 8, 1941 |
| 2,306,796 | Staley et al. | Dec. 29, 1942 |
| 2,342,901 | Schutt et al. | Feb. 29, 1944 |
| 2,696,774 | Bayley | Dec. 14, 1954 |

FOREIGN PATENTS

| | | |
|---|---|---|
| 295,346 | Great Britain | Aug. 9, 1928 |
| 472,963 | Italy | July 9, 1952 |
| 875,002 | Germany | Apr. 30, 1953 |
| 289,569 | Switzerland | July 1, 1953 |